(12) United States Patent
Benedict et al.

(10) Patent No.: US 10,210,107 B2
(45) Date of Patent: Feb. 19, 2019

(54) TRANS-FABRIC INSTRUCTION SET FOR A COMMUNICATION FABRIC

(71) Applicant: HEWLETT PACKARD ENTERPRISE DEVELOPMENT LP, Houston, TX (US)

(72) Inventors: Melvin K. Benedict, Houston, TX (US); Michael R. Krause, Palo Alto, CA (US); Mitchel E. Wright, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 121 days.

(21) Appl. No.: 15/518,195

(22) PCT Filed: Oct. 29, 2014

(86) PCT No.: PCT/US2014/062849
§ 371 (c)(1),
(2) Date: Apr. 10, 2017

(87) PCT Pub. No.: WO2016/068903
PCT Pub. Date: May 6, 2016

(65) Prior Publication Data
US 2017/0300433 A1    Oct. 19, 2017

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 13/16* | (2006.01) | |
| *G06F 15/78* | (2006.01) | |
| *H04L 12/911* | (2013.01) | |

(52) U.S. Cl.
CPC ...... *G06F 13/1668* (2013.01); *G06F 15/7821* (2013.01); *G06F 13/1694* (2013.01); *H04L 47/70* (2013.01)

(58) Field of Classification Search
CPC ............. G06F 13/1668; G06F 13/1694; G06F 15/7821
USPC ....................................... 711/154
See application file for complete search history.

(56) References Cited

U.S. PATENT DOCUMENTS

| | | | |
|---|---|---|---|
| 6,035,378 | A | 3/2000 | James |
| 6,044,438 | A | 3/2000 | Olnowich |
| 7,016,971 | B1 | 3/2006 | Recio et al. |
| 7,065,688 | B1 | 6/2006 | Moyes et al. |
| 7,734,894 | B1 | 6/2010 | Wentzlaff et al. |
| 7,805,577 | B1 | 9/2010 | Mattina et al. |
| 8,078,897 | B2 | 12/2011 | Sajayan et al. |
| 8,566,570 | B2 | 10/2013 | Housty |
| 8,706,879 | B2 | 4/2014 | Sparks |

(Continued)

OTHER PUBLICATIONS

International Search Report & Written Opinion received in PCT Application No. PCT/US2014/062849, dated May 28, 2015, 10 pages.

(Continued)

*Primary Examiner* — Edward J Dudek, Jr.
*Assistant Examiner* — Sidney Li
(74) *Attorney, Agent, or Firm* — Trop, Pruner & Hu, P.C.

(57) ABSTRACT

A memory controller of a sender node issues an instruction of a trans-fabric instruction set of instructions to a receiver node across a communication fabric that supports memory semantic operations, to cause a given transaction to be performed at the receiver node in response to the issued instruction.

15 Claims, 5 Drawing Sheets

(56) References Cited

U.S. PATENT DOCUMENTS

| | | |
|---|---|---|
| 8,738,860 B1 | 5/2014 | Griffin et al. |
| 2008/0109573 A1 | 5/2008 | Leonard et al. |
| 2009/0031055 A1 | 1/2009 | Archer et al. |
| 2011/0173441 A1* | 7/2011 | Bagepalli .............. H04L 63/166 713/153 |
| 2011/0179225 A1* | 7/2011 | Flynn .................... G06F 3/0613 711/114 |
| 2014/0089572 A1 | 3/2014 | Koka et al. |

OTHER PUBLICATIONS

Kounev, S. et al., "Automated Simulation-Based Capacity Planning for Enterprise Data Fabrics," (Research Paper), Mar. 21, 2011, p. 27-36, available at http://dl.acm.org/citation.cfm?id=2151060.

\* cited by examiner

TRANS-FABRIC INSTRUCTION SET FOR A COMMUNICATION FABRIC

BACKGROUND

Devices can be connected to a communication fabric to allow the devices to communicate with each other. The communication fabric can include communication nodes (e.g. switches or routers) for forwarding or relaying messages and traffic between the devices.

BRIEF DESCRIPTION OF THE DRAWINGS

Some implementations are described with respect to the following figures.

DETAILED DESCRIPTION

Figure 1A:
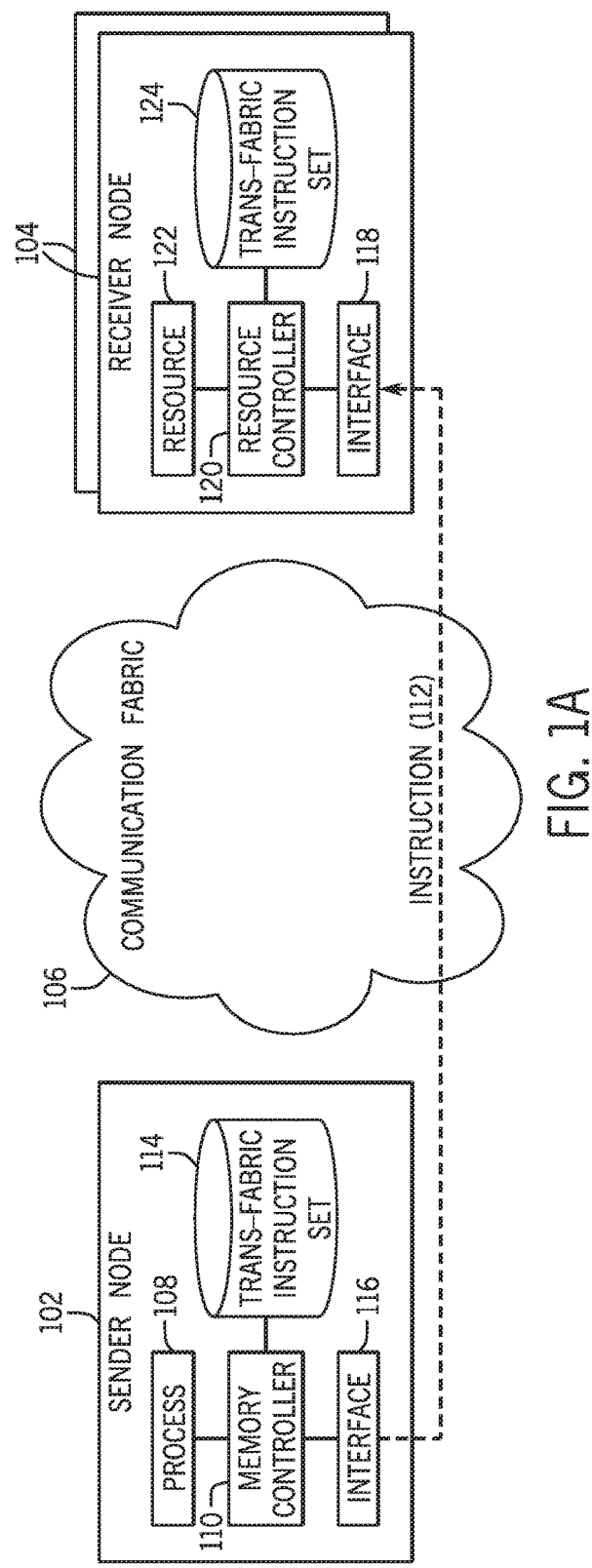
FIG. 1A is a schematic diagram of an example network arrangement according to some implementations.

A communication fabric can be included in a system (including a computer or an arrangement of computers) in which a node (such as a processor) can access data in a memory. A "node" can refer to any device that is able to communicate over the communication fabric. Some memory control architectures can provide memory control logic in a processor (or another node), where the memory control logic issues memory access commands to access data in the memory. In some examples, the processor can be a system on chip (SOC) processor, which includes a chip (integrated circuit die) on which various components can be provided, including a processing core, the memory control logic, and other circuitry.

The memory control logic in the processor issues memory access commands that conform to a specification that governs characteristics of the commands used to control the memory. The characteristics of the commands can include timings of signals, specific signals used, types of low-level commands, and so forth. The signals and the low-level commands are those signals and commands that are provided to the memory to affect an operation of the memory.

However, including the entirety of the memory control logic in the processor increases complexity of the processor, and reduces flexibility in deployment of different components in a system that can include a communication fabric.

In accordance with some implementations, a split memory control architecture can be used in which the functionalities of a memory control logic can be split across different nodes. For example, a first part of the memory control logic can be provided at a processor (or other sender node that is able to issue requests), while a second part of the memory control logic can be included in a receiver node that includes or has access to the memory to be accessed. A "receiver node" can refer to a node that receives a communication from a node that sends the communication (a "sender node"). Note that each node can act as a receiver node in some instances, and as a sender node in other instances.

More generally, in further implementations, for other types of resources (e.g. storage regions of a persistent storage device, processing resources, communication resources, etc.) that can be accessed by a node, a split resource control architecture can be implemented, where the control logic for the resource can be split between a sender node and a receiver node that includes or has access to the resource.

Examples of nodes coupled over a communication fabric can include any combination of the following: computers (e.g. desktop computers, notebook computers, tablet computers, server computers, etc.), handheld devices (e.g. smartphones, personal digital assistants, etc.), storage systems (e.g. memory devices or modules, persistent storage devices or arrays, etc.), processors, graphics controllers, network interface controllers, and/or other types of electronic devices or electronic components. More generally, a node can refer to an entire machine that has multiple electronic components, or alternatively, a node can refer to an electronic component within a machine.

In some implementations, the communication fabric operates according to an interconnect protocol that supports or employs memory semantic operations. A "memory semantic operation" can refer to an operation that employs memory requests to communicate between a sender node and a receiver node. For example, the sender node can be a processor, while the receiver node can be a memory. The memory requests can include a read request, a write request, an atomic operation request, and so forth, which can be issued by the sender node to access data in the receiver node. In some implementations, the interconnect protocol can support or employ memory semantic operations as well as other types of operations between nodes.

To improve flexibility and efficiency of nodes and a communication fabric over which the nodes are able communicate, a trans-fabric instruction set of instructions can be defined to allow sender nodes to issue the instructions of the trans-fabric instruction set to receiver nodes over the communication fabric. The instructions of the trans-fabric instruction set can include memory requests for performing the memory semantic operations of the interconnect protocol.

In some implementations, each instruction of the trans-fabric instruction set is independent of the specification pertaining to low-level commands for accessing the resource. As a result, the sender node does not have to be configured to support the specification pertaining to the low-level commands for accessing the resource, which can simplify the design of the sender node.

In further implementations, each instruction of the trans-fabric instruction set is independent of resource-related operations for performing a respective transaction at the receiver node in response to each instruction, where the resource-related operations are performed with respect to at least one resource for the respective transaction. An example of a resource-related operation can include converting a high-level request to a low-level command (or commands). Another example of a resource-related operation can include calculating an address based on a pointer or variable included in an instruction, where the address identifies a specific location of data in a memory or other resource.

Other examples of resource-related operations can include setting up registers at the receiver device for performing operations for the transaction, calculating address ranges relevant to the operations for the transaction, and so forth.

FIG. 1A shows an example network arrangement that includes the split resource control architecture discussed above. In the example of FIG. 1A, a sender node 102 and a receiver node 104 (or multiple receiver nodes 104) are capable of communicating over a communication fabric 106.

The communication fabric 106 includes various communication links (e.g. electrical links, optical links, wireless links, etc.) over which nodes coupled to the communication fabric 106 are able to communicate. In addition, the communication fabric 106 can include communication nodes that are able to forward or relay data over the communication fabric 106. Such communication nodes can include switches, routers, or any other communication node that is able to forward or relay traffic from one endpoint device to another endpoint device (e.g. from the sender node 102 to the receiver node 104). In addition, the communication fabric 106 can include management nodes for performing various management tasks with respect to the communication fabric 106.

Although just one sender node 102 and two receiver nodes 104 are shown as coupled to the communication fabric 106, it is noted that in other examples, additional endpoint devices can be coupled to the communication fabric 106.

The sender node 102 includes a process 108 that is able to issue a request to perform a transaction with respect to the receiver node 104. A process can refer to an instance of a program or an instance of a portion of a program that is executed on a processor. A process can also refer to a thread that is started for the program or portion of the program—note that multiple threads can be started for the program (portion). Examples of a program can include a software application, an operating system module, firmware, a virtualization layer for performing virtualization in the sender node 102, or any other type of machine-readable instructions.

The sender node 102 also includes a memory controller 110 that is able to issue an instruction over the communication fabric 106 in response to a request of the process 108. The memory controller 110 is able to issue an instruction 112 that is an instruction from a trans-fabric instruction set of instructions 114. Information relating to the trans-fabric instruction set 114 can be stored on a storage medium in the sender node 102, or alternatively, can be configured in the memory controller 110. The memory controller 110 is able to issue instructions over the communication fabric 106 that supports memory semantic operations. In response to the request of the process 108, the memory controller 110 can issue just one instruction, or multiple instructions for handling by one or multiple receiver nodes 104.

The sender node 102 also includes an interface 116 that includes logic and circuitry to allow the sender node 102 to communicate over the communication fabric 106. The interface 116 can include a physical layer that transmits and receives signals over links of the communication fabric 106. Note that the interface 116 can also include upper layers above the physical layer. These upper layers can include a protocol layer that operates according to a protocol used for communications over the communication fabric 106. This protocol can be the interconnect protocol noted above.

In addition, the interface 116 can also include logic to perform various tasks, including address translation and protection-related tasks. In other examples, the logic to perform the address translation and/or the protection-related tasks can be omitted. Address translation can refer to translating an address for a transaction between a first address space and a second address space. As examples, address translations can include an address translation from a first physical address space to a second physical address space, an address translation from a virtual address space to a physical address space, an address translation from a physical address space to a virtual address space, and an address translation between a first virtual address space and a second virtual address space.

Protection-related tasks can include the adding of information into a transaction packet that carries the instruction 112 sent by the sender node 102. For example, the added information can include a node identifier (ID) of the sender node 102, and a process ID of the process 108.

As noted above, a process can refer to an instance of a program or an instance of a portion of a program that is executed. A process can also refer to a thread that is started for the program or portion of the program—note that multiple threads can be started for the program (portion). In examples where a process is a thread, then a process ID can also be considered a thread ID. More generally, a process can refer to any instance of machine-readable instructions that execute on a node to perform specified task(s).

Each node is assigned a unique node ID that distinguishes that node from another node. The combination of a node ID and a process ID provides a unique fabric-wide identifier for an entity that is involved in a transaction.

The process ID and node ID included in a transaction packet can be used by a node to perform authentication for a transaction. Performing authentication for a transaction can include one or any combination of the following: (1) determining whether a sender of the transaction is authorized to perform the transaction, or (2) determining whether the sender has a privilege to access a requested resource as part of performing the transaction.

The node ID and the process ID can be inserted in one or multiple fields of a transaction packet that carries the instruction 112. A transaction packet can carry various information that relate to a transaction. A transaction can refer to any interaction or session between two or more than two nodes. For example, a transaction can refer to a memory read operation that is initiated by a memory read request, a memory write operation that is initiated by a memory write request, an operation that invokes a functionality of a graphics controller, a network interface controller, another input/output (I/O) controller, an accelerator, and so forth.

In some examples, a transaction packet can carry an instruction sent from one node to another node to perform a requested operation in a respective transaction. In other examples, a transaction packet can carry traffic data related to the transaction from one node to another node. A transaction packet can refer to any data unit that is used to carry information over a communication fabric for a respective transaction.

In response to the instruction 112 issued by the memory controller 110, the interface 116 sends a transaction packet carrying the instruction 112 through the communication fabric 106 to the receiver node 104.

The receiver node 104 includes an interface 118 that allows the receiver node 104 to communicate over the communication fabric 106. Similar to the interface 116 in the sender node 102, the interface 118 in the receiver node 104 can include a physical layer, a protocol layer, and logic to perform address translation and protection-related tasks. The protection-related tasks performed by the interface 118 in the receiver node 104 can include using the process ID and node ID in the transaction packet to perform authentication for the transaction related to the transaction packet. In other examples, the interface 118 can omit performing the address translation and/or the protection-related tasks.

The authentication performed by the interface 118 can include one or any combination of the following: (1) determining whether a sender of the transaction packet is authorized to perform the transaction, or (2) determining whether the sender has a privilege to access a requested resource (e.g. resource 122 associated with the receiver node 104). Note that "sender" can refer to the combination of the sender node 102 and the process 108 in the sender node 102 that issued the transaction.

Although the resource 122 is shown as being included in the receiver node 104, it is noted that in other examples, the resource 122 can be external of the receiver node 104, but is accessible by the receiver node 104. More generally, the resource 122 can be considered to be associated with the receiver node 104, where the resource 122 can be included in the receiver node 104 or is external but accessible by the receiver node 104.

The receiver node 104 also includes a resource controller 120 that manages access of the resource 122. A resource controller 120 can receive the instruction 112 issued by the memory controller 110 in the sender node 102, and can issue a respective low-level command (or commands) to the resource 122. The resource controller 120 has access to information relating to a trans-fabric instruction set 124 to allow the resource controller 120 to decode the received instruction 112. The information relating to the trans-fabric instruction set 124 can be stored on a storage medium accessible by the resource controller 120, or can be configured in the resource controller 120.

The low-level command(s) issued by the resource controller 120 conform(s) to a specification of the resource 122, as explained above.

In some examples, if the resource 122 is a memory, then the resource controller 120 can be a media controller. The media controller performs an access of memory in response to the received instruction 112. The media controller is able to issue a low-level memory command (or commands) over a memory bus between the media controller and the memory.

In addition to producing command(s) responsive to the instruction 112 from the memory controller 110, the media controller can also perform other tasks with respect to the memory. For example, if the memory is a DRAM, then the media controller is able to perform refresh operations with respect to the DRAM. A storage cell in a DRAM gradually loses its charge over time. To address this gradual loss of charge in a storage cell, a DRAM can be periodically refreshed, to restore the charge of storage cells to their respective levels.

In other examples, if the memory is implemented with a flash memory, then the media controller can include wear-leveling logic to even out the wear among the storage cells of the memory. In addition, the media controller can perform other media-specific operations with respect to the memory, such as a data integrity operation (e.g. error detection and correction), a data availability operation (e.g. failover in case of memory error), and so forth. The media controller can also perform power management (e.g. reduce power setting of the memory when not in use), statistics gathering (to gather performance statistics of the memory during operation), and so forth.

In examples where the resource 122 is another type of resource (different from a memory), the resource controller 120 can also perform various tasks with respect to the resource 122, such as power management, statistics gathering, and so forth.

Figure 1B:
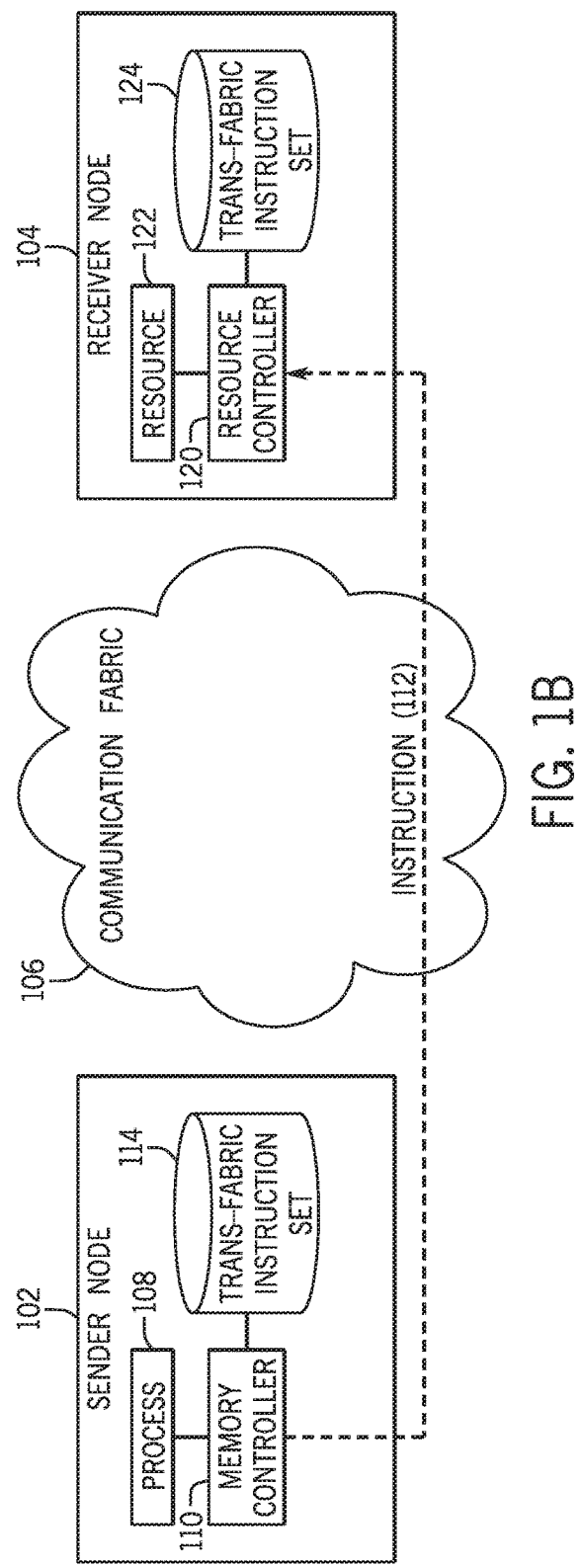
FIG. 1B is a schematic diagram of an example network arrangement according to further implementations.

FIG. 1B is a block diagram of an example network that includes a split resource control architecture according to further implementations. In the example of FIG. 1B, the sender node 102 and a receiver node 104 are depicted without the interface 116 and interface 118 of FIG. 1A.

Figure 2:
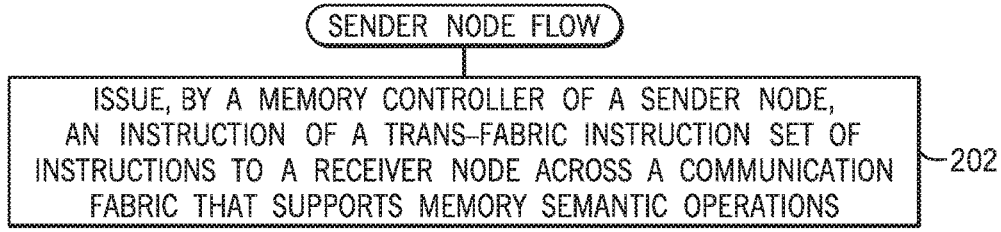
FIGS. 2 and 3 are flow diagrams of example flows performed by a sender node according to some implementations.

FIG. 2 is a flow diagram of a task that can be performed by the sender node 102 according to some implementations. The process includes issuing (at 202), by the memory controller 110 of the sender node 102, an instruction of a trans-fabric instruction set of instructions to the receiver node 104 across the communication fabric 106 that supports memory semantic operations, to cause a given transaction to be performed at the receiver node 104 in response to the issued instruction. In some implementations, each instruction of the trans-fabric instruction set is independent of resource-related operations for performing a respective transaction of the receiver node, where the resource-related operations are performed with respect to at least one resource for the respective transaction. In other implementations, each instruction of the trans-fabric instruction set is independent of a specification pertaining to low-level commands for accessing a resource.

Further, by using the split control architecture according to some implementations, the memory controller 110 is able to issue an instruction (of the trans-fabric instruction set) without knowing a specific location of data at the receiver node 104 that is to be accessed by the instruction. In other words, the sender node 102 is able to issue the instruction without having to use location information at the sender node 102 regarding a specific location of data at the receiver node 104 to be accessed by a given transaction corresponding to the instruction. In other examples, the sender node 102 is able to use the location information regarding a specific location of data at the receiver node 104.

Figure 3:
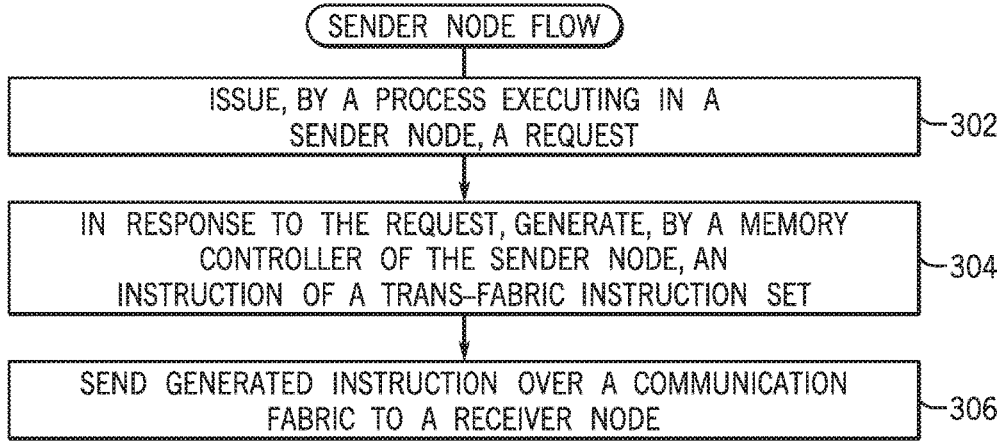

FIG. 3 is a flow diagram of tasks of the sender node according to further implementations. The process 108 executing in the sender node 102 issues (at 302) a request. In response to the request of the process 108, the memory controller 110 generates (at 304) an instruction of the trans-fabric instruction set. The instruction generated by the memory controller 110 is sent (at 306) over the communication fabric 106 to the receiver node 104.

Figure 4:
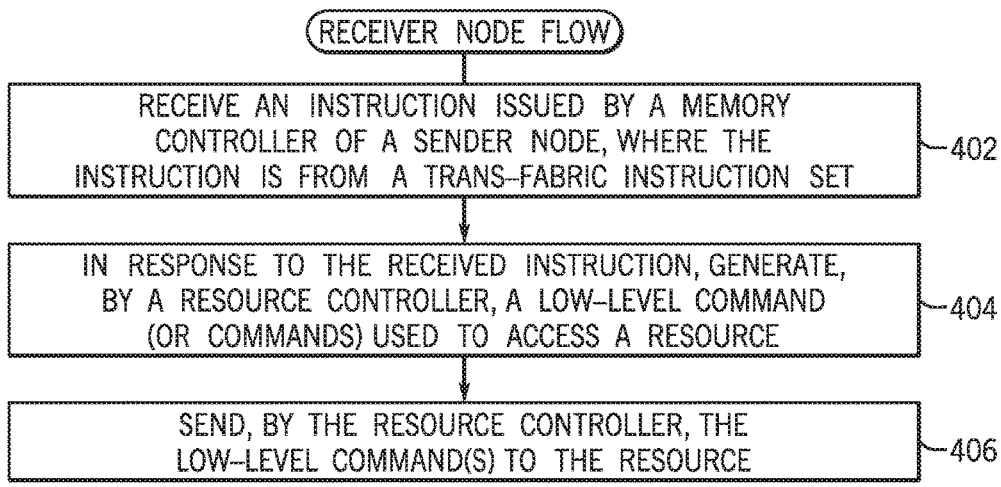
FIG. 4 is a flow diagram of an example flow performed by a receiver node according to some implementations.

FIG. 4 is a flow diagram of tasks of the receiver node 104 according to some implementations. The receiver node 104 receives (at 402) an instruction issued by the memory controller 110 of the sender node 102, where the received instruction is one of the instructions of a trans-fabric instruction set. In response to the received instruction, the resource controller 120 in the receiver node 104 generates (at 404) a low-level command (or commands) that is (are) used to access the resource 122 of the receiver node 104. The resource controller 120 or another entity in the receiver node 104 can also perform another resource-related operation as noted further above.

The resource controller 120 sends (at 406) the low-level command(s) to the resource 122, to cause the resource 122 to perform an action (or actions) in response to the low-level command (or commands) from the resource controller 120. The action(s) can include a read operation, a write operation, an operation to allocate a memory region, and so forth.

The instructions of the trans-fabric instruction set can include various different types of instructions. In some examples, an instruction of the trans-fabric instruction set can include a self-modifying instruction that has at least one variable that is updated at the receiver node 104. A specific value of the variable may be unknown to the sender node 102 at the time that the self-modifying instruction is issued by the sender node 102. The value of the variable is set by the receiver node 104 when the receiver node 104 receives and processes the self-modifying instruction.

As examples, data at the receiver node 104 can be accessed using a series or chain of pointers, where this series or chain of pointers is unknown to the sender node 102. Rather than determine a specific series or chain of pointers at the sender node 102, the memory controller 110 can instead develop a series of instructions (e.g. read instructions) for reading respective variables (whose specific values are unknown to the sender node 102). This series of instructions are issued to the receiver node 104. The receiver node 104 is able to set the values of the variables of the received instructions, which effectively modifies the instructions. In this way, the specific series of pointers for accessing data at the receiver node 104 can be produced by the receiver node 104 (e.g. the resource controller 120) when processing the received series of instructions. The instructions are referred to as self-modifying instructions, since the instructions are subject to modification by the receiver node 104 that receives the instructions.

In further examples, instructions of the trans-fabric instruction set can include conditional instructions, which can include if-then statements. Conditional instructions include instructions that are conditionally executed by the receiver node 104 based on whether a condition (or conditions) is (are) true at the receiver node. In some cases, the conditional instructions can include a self-modifying instruction (or multiple self-modifying instructions).

The use of conditional instructions and/or self-modifying instructions allows for the sender node 102 to build a collection of instructions that define a schema of operations that are to be performed for a given transaction. This schema of operations is to be executed at the receiver node 104 based on whether a condition (or conditions) is (are) satisfied, and/or based on modification of at least some of the instructions.

The trans-fabric instruction set can be customized to respective split applications that can be implemented using the split control architecture discussed above, which includes the memory controller 110 and the resource controller 120. Different split applications can refer to different types of split control logic or different types of resources at respective receiver nodes.

The following provides further examples of instructions that can be included in a trans-fabric instruction set according to some implementations. The instructions can include a read (or load) instruction to read data, and a write (or store) instruction to write data. As other examples, the instructions can include an allocate instruction to allocate a region of a memory or other storage device to a specific address or address range, such as a physical address (range), virtual address (range), symbolic address (range), and so forth. More generally, the allocation instruction can allocate a resource (or segment of a resource) to an address (or address range) or to a node.

Further, the instructions can include a series of instructions to perform reserve, read/write, and release tasks. The reserve task includes reserving a region of a memory or other storage device, the read/write task includes reading or writing the reserved region, and the release task includes releasing the reserved region once the read/write task is complete. The reserved region may be a shared region shared by multiple entities. Reserving the shared region protects the data in the shared region from being modified by multiple entities in an incoherent manner. More generally, the reserve, read/write, and release tasks can be performed with respect to a resource (or resource segment).

Another example instruction is a find instruction, which can search a region of a memory or other storage device to find a specific data pattern. Yet another example instruction is a purge instruction to delete data.

There can be other example instructions in the trans-fabric instruction set.

Figure 5:
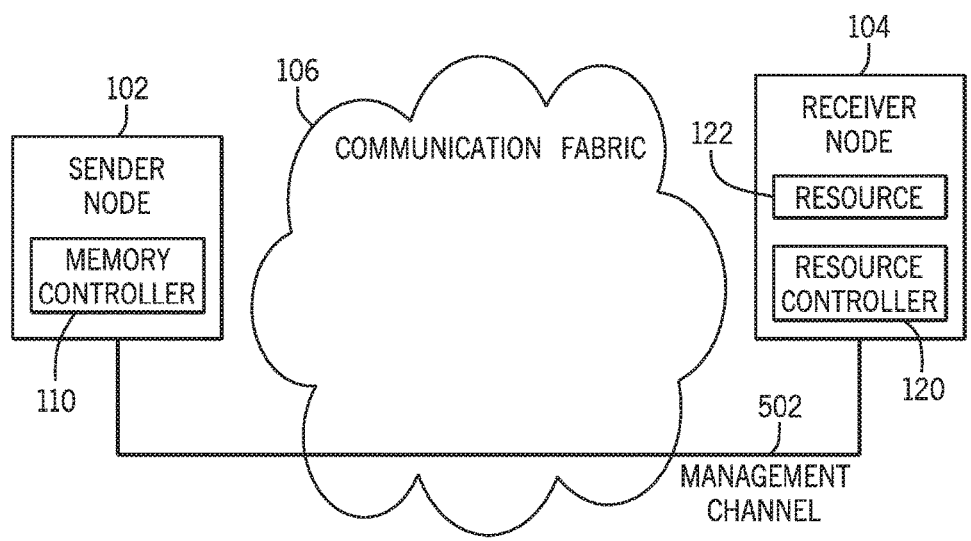
FIG. 5 is a schematic diagram of another example network arrangement according to alternative implementations.

In accordance with some implementations, as shown in FIG. 5, a management channel 502 can also be provided between nodes coupled to the communication fabric 106, such as the sender node 102 and the receiver node 104. The management channel 502 can be a virtual channel within the communication fabric 106, or alternatively, the management channel 502 can be an out-of-band channel (separate from channels used to communicate data of the communication fabric 106).

The management channel 502 can be used to send various management commands or management information between nodes, such as between the sender node 102 and the receiver node 104. The management commands or management information can include a command to trigger initialization of a node, a command to reset a node, a command to discover a node (e.g. discover presence of a node or characteristics of the node), and a command or information relating to monitoring performance of a node (e.g. a first node can send a request to monitor a second node, and the second node can send performance data to the first node in response to the request).

Figure 6:
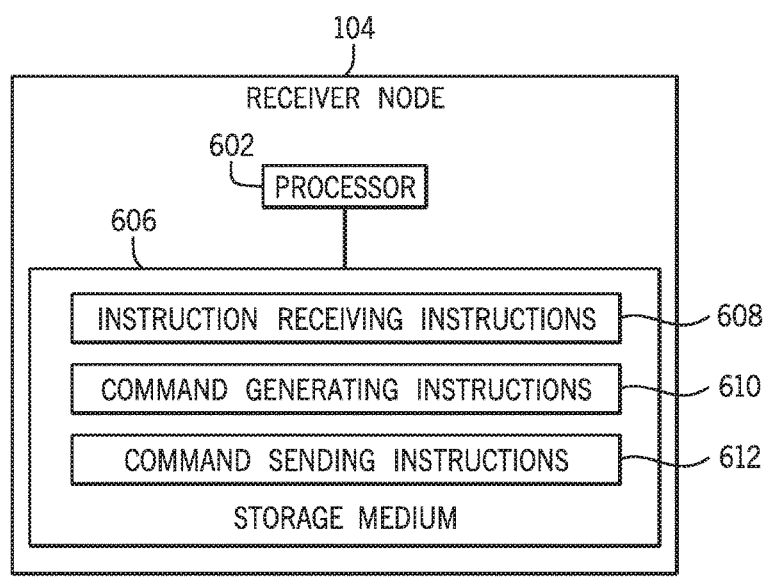
FIG. 6 is a block diagram of an example receiver node according to some implementations.

FIG. 6 is a block diagram of an example receiver node 104 in accordance with some implementations. Note that the receiver node 104 can represent an entire machine or a component within a machine (or within an arrangement of machines).

The receiver node 104 includes one or multiple processors 602. A processor can include a microprocessor or a core of the microprocessor, a microcontroller, a physical processor module or subsystem, a programmable integrated circuit, a programmable gate array, and so forth.

In addition, the receiver node 104 includes one or multiple non-transitory computer-readable or machine-readable storage media 606, which can store machine-readable instructions. As examples, the storage medium (or storage media) 606 can store machine-readable instructions of the resource controller 120 of FIG. 1A, 1B, or 5, which can include instruction receiving instructions 608 to receive an instruction from a memory controller of a sender node over a communication fabric, command generating instructions 610 to generate, in response to the received instruction, a command that conforms to a specification of a resource, and command sending instructions 612 to send the command to the resource to cause the resource to perform a respective action. More generally, the machine-readable instructions of the receiver node 104 can perform any of the tasks discussed above, such as those shown in FIG. 4, or other tasks. The machine-readable instructions are executable on the one or multiple processors 602.

Figure 7:
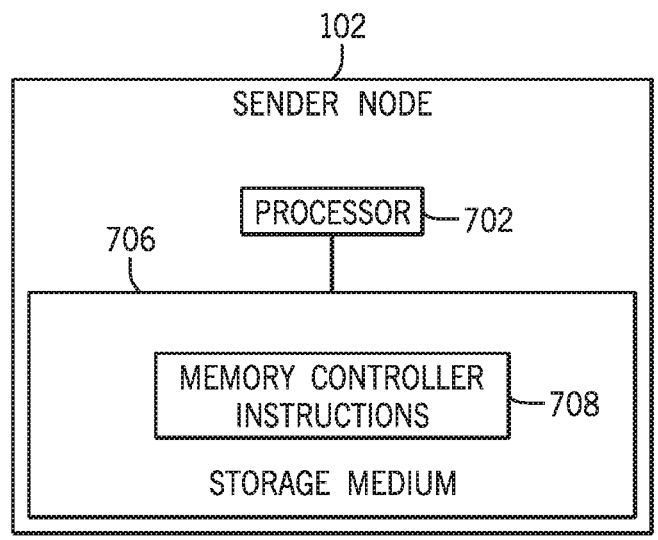
FIG. 7 is a block diagram of an example sender node according to some implementations.

FIG. 7 is a block diagram of an example sender node 102 in accordance with some implementations. Note that the sender node 102 can represent an entire machine or a component within a machine (or within an arrangement of machines).

The sender node 102 includes one or multiple processors 702. In addition, the sender node 102 includes one or multiple non-transitory computer-readable or machine-readable storage media 706, which can store machine-readable instructions. For example, the machine-readable instructions can include memory controller instructions 708 that are part of the memory controller 110 of FIG. 1A, 1B, or 5, or of other instructions in the sender node 102. More generally, the machine-readable instructions of the sender node 102 can perform any of the tasks discussed above, such as those shown in FIG. 2 or 3, or other tasks. The machine-readable instructions are executable on the one or multiple processors 702.

Figure 8:
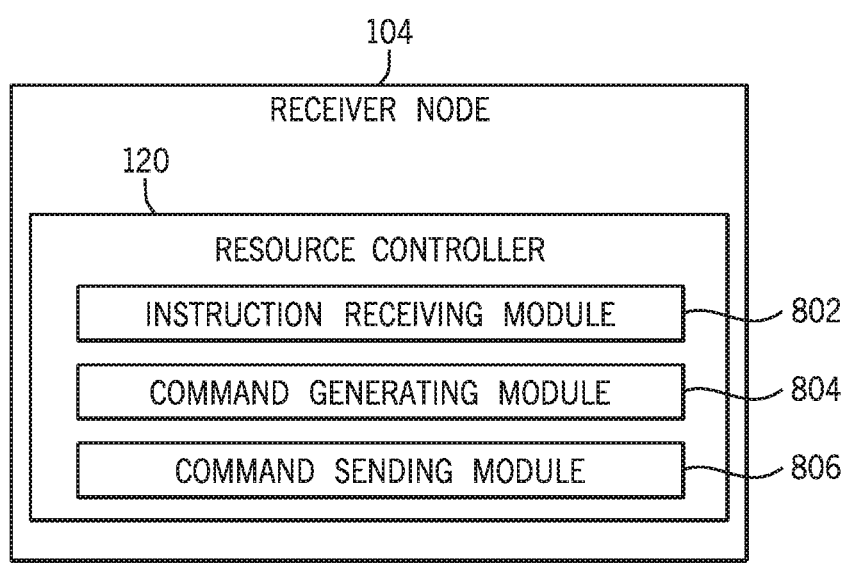
FIG. 8 is a block diagram of another example receiver node according to further implementations.

FIG. 8 is a block diagram of another example receiver node 104 according to further implementations. The resource controller 120 of the receiver node 104 includes an instruction receiving module 802 to receive an instruction from the memory controller of the sender node over the communication fabric that supports memory-semantic operations.

The resource controller 120 also includes a command generating module 804 to generate, in response to the received instruction, at least one command that conforms to a specification of the resource. The resource controller 120 further includes a command sending module 806 to send the at least one command to the resource to cause the resource to perform a respective action.

The storage medium (or storage media) 606 or 706 (of FIG. 6 or 7, respectively) can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or any other types of volatile or non-volatile storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   issuing, by a memory controller of a sender node, an instruction of a trans-fabric instruction set of instructions to a receiver node across a communication fabric that supports memory semantic operations, to cause a given transaction to be performed at the receiver node in response to the issued instruction,
   wherein each instruction of the trans-fabric instruction set is independent of resource-related operations for performing a respective transaction at the receiver node, the resource-related operations performed with respect to at least one resource for the respective transaction.

2. The method of claim 1, wherein issuing the instruction to the receiver node is performed without having to use location information at the sender node regarding a specific location of data at the receiver node accessed in the given transaction.

3. The method of claim 2, wherein the location information of the specific location of the data at the receiver node is unknown to the sender node.

4. The method of claim 1, wherein the issued instruction is a self-modifying instruction having at least one variable that is updated at the receiver node.

5. The method of claim 1, wherein the issued instruction is part of a collection of instructions issued by the memory controller to the receiver node, the collection of instructions including conditional instructions that cause different operations at the receiver node based on whether or not at least one condition is true at the receiver node.

6. The method of claim 1, wherein the memory controller is part of a split control architecture for a given resource at the receiver node, and wherein the split control architecture further comprises a resource controller at the receiver node to perform resource-related operations with respect to the given resource in response to the issued transaction.

7. The method of claim 6, wherein the given resource at the receiver node is a memory, and the resource controller is a media controller that generates commands in response to instructions from the memory controller, the commands generated by the media controller conforming to a specification for the memory.

8. The method of claim 1, wherein the instructions of the trans-fabric instruction set include at least a subset selected from among: an allocate instruction to allocate a resource or resource segment, an instruction sequence that includes reserving the resource or resource segment and releasing the resource or resource segment, a find instruction to find a pattern of data, and a purge instruction to delete data.

9. The method of claim 1, further comprising:
   communicating, between the sender node and the receiver node, information relating to a management task over a management channel associated with the communication fabric, the management task selected from among initializing a device, resetting a device, discovering a device, and communicating performance data of a device.

10. A system comprising:
   a sender node including a memory controller;
   a communication fabric; and
   a receiver node including a resource and a resource controller to access the resource, wherein the resource controller is to generate commands according to a specification pertaining to signals of the resource, wherein the sender node and the receiver node are to communicate over the communication fabric that supports memory semantic operations, and wherein the sender node and the receiver node include information relating to a trans-fabric instruction set of instructions that are issuable by the memory controller over the communication fabric by the sender node to the receiver node to cause performance of respective transactions at the receiver node in response to the instructions, wherein each instruction of the trans-fabric instruction set is independent of the specification pertaining to commands for accessing the resource.

11. The system of claim 10, wherein the resource in the receiver node includes a memory, and wherein the resource controller includes a media controller.

12. The system of claim 11, wherein the media controller is to generate commands to access the memory in response to a given instruction of the trans-fabric instruction set, the commands generated in response to the given instruction conforming to the specification.

13. The system of claim 10; wherein the specification governs timings and types of commands of the resource.

14. A receiver node comprising:
a resource controller to manage access a resource, the resource controller to:
receive an instruction from a memory controller of a sender node over a communication fabric that supports memory-semantic operations, the instruction being an instruction of a trans-fabric instruction set of instructions, and wherein each instruction of the trans-fabric instruction set is independent of resource-related operations for performing a respective transaction at the receiver node, the resource-related operations performed with respect to the resource for the respective transaction; and
generate, in response to the received instruction, at least one command that conforms to a specification of the resource; and
send the at least one command to the resource to cause the resource to perform a respective action.

15. The receiver node of claim 14, wherein each instruction of the trans-fabric instruction set is independent of the specification pertaining to low-level commands for accessing the resource.

* * * * *